3,335,058
STREPTOMYCYLIDENE AMINE CONDENSATES
Hubert Vanderhaeghe, Winksele, and Paul Claes, Kessel-Lo, Belgium, assignors to Recherche et Industrie Therapeutiques R.I.T., Genval, Belgium, a corporation of Belgium
No Drawing. Filed June 24, 1965, Ser. No. 466,825
Claims priority, application Great Britain, July 2, 1964, 27,454/64
5 Claims. (Cl. 167—65)

This invention pertains to novel poly-streptomycylidene derivatives which are obtained when condensing streptomycin with chemical compounds having in their formula at least two amino groups reactive with the aldehyde function and selected from the class consisting of hydrazino, hydrazido and amino-oxy groups and to the pharmaceutically acceptable addition salts of these poly-streptomycylidene derivatives.

Examples of compounds having at least two amino groups reactive with the aldehyde function are those of general formula $$H_2N\text{—}A\text{—}NH_2$$

wherein A is selected from the class consisting of the —O—(CH$_2$)$_n$—O— (wherein $n$ is at least 2 and not higher than 6),

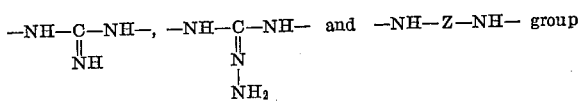

wherein Z is a member of the class consisting of the lower alkylene (1 to 4 carbon atoms)—poly (from 2 to 4)—carbonyl radicals and the residues of organic compounds selected from the class consisting of lower alkanes (1 to 6 carbon atoms), benzene, diphenyl, diphenylmethane, poly-methylene (2 to 4 carbon atoms)—biphenyl, naphthalene, and the hydrazino and carbohydrazido derivatives of said radicals and organic compounds.

Thus, the poly-streptomycylidene derivatives of this invention may be represented by the general formula $$[\text{Streptomycylidene}{=}N\text{—}]_nA'$$

wherein $n$ is at least 2 and not higher than 4 and A' is the appropriate polyvalent group derived from the hereabove defined polyamino reagent of general formula $$H_2N\text{—}A\text{—}NH_2$$

The reaction conditions for preparing the poly-streptomycylidene derivatives of this invention are those generally suitable for preparing aldoximes and hydrazones but, preferably, the reaction will be carried out at room temperature in a solvent such as water, the reagents be-

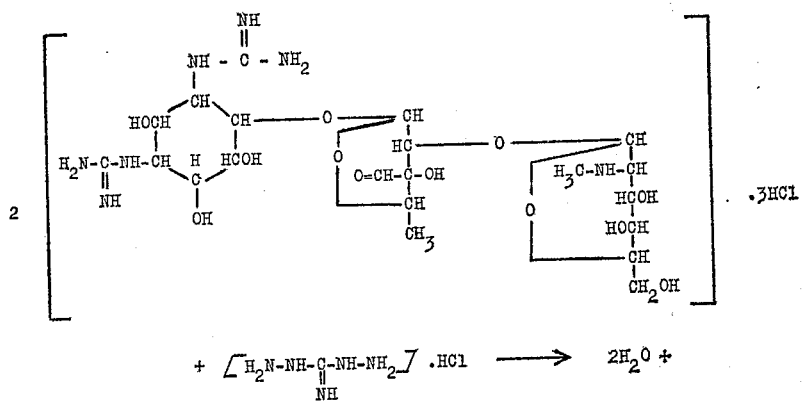

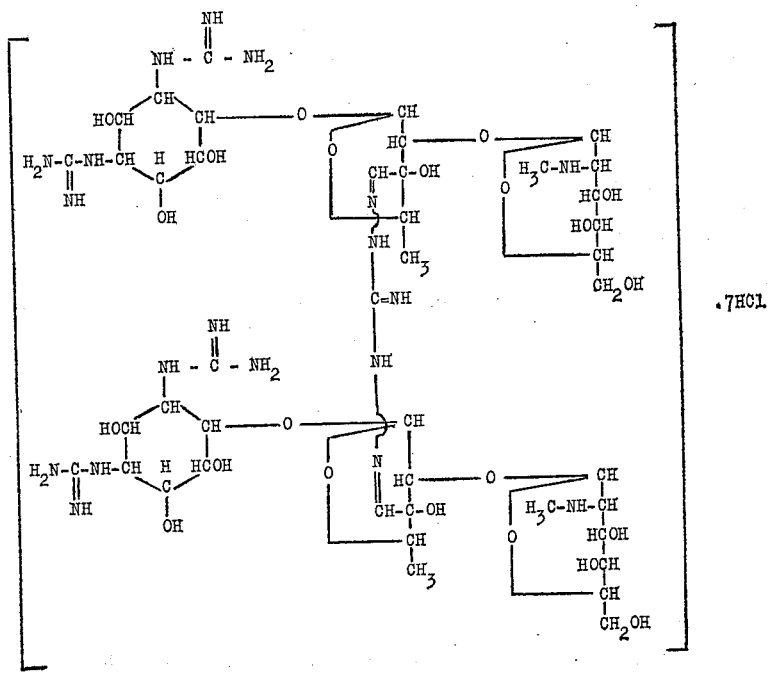

ing employed as acid addition salts thereof, for instance, the hydrochloride.

The poly-streptomycylidene derivatives of this invention have characteristic pharmacologic properties that differentiate them from the starting streptomycin: they have a significant lowering action on cholesterol levels and, more generally, on serum lipid levels and they are substantially devoid of the antibiotic activity of the starting streptomycin (an advantage for a product for lowering cholesterol levels).

For practical use, the compounds of this invention are combined with a carrier in pharmaceutical dosage unit form such as in a capsule, tablet or suspension and administered orally. The amount of product per dosage unit will vary from 100 mg. to 1 g. The daily dosage regimen will vary from about 500 mg. to 3 g.

The scheme shown exemplifies the reaction according to the invention when diamino guanidine is used as polyamino reagent.

Thus, in this way, di-streptomycylidene-diamino-guanidine is obtained as the heptahydrochloride.

Examples of pharmaceutically acceptable addition salts cited above are the hydrochloride, sulfate, phosphate, maleate, fumarate, succinate, tartrate, oxalate, citrate, methane sulfonate and other ones known to the art.

Products of the present invention have been administered orally during several weeks in dosage unit form to animals. During the experiments, appreciable lowering of cholesterol levels was obtained.

The compounds of the present invention may be administered orally using any pharmaceutical form known to the art for such administration. Examples of pharmaceutical form are powders, capsules, tablets, syrups, sustained release forms and the like, the capsule form being preferred in practice. The following nonlimitative examples illustrate the invention,

EXAMPLE 1

Streptomycin trihydrochloride (8.10 g.) and 0.740 g. of diamino-guanidine hydrochloride are dissolved in 200 ml. of water and the solution is allowed to stand overnight at room temperature.

The solution is then concentrated by evaporation of the solvent to obtain a syrup which is taken up with absolute ethanol. After triturating, a powder is obtained, a sample (9 g.) of which is purified by dissolution in 250 ml. of methanol followed by addition of ether for giving di(streptomycylideneamino)guanidine heptahydrochloride which is practically devoid of the antibiotic potency of the starting streptomycin trihydrochloride against *E. coli* and *Micrococcus pyogenes* var. *aureus* (ATCC 6538 P).

When the obtained di(streptomycylideneamino)guanidine heptahydrochloride is examined by ascending paper chromatography on Schleicher & Schüll No. 2043 (paper washed with acid) in the system n-propanol/acetic acid/pyridine/water 10:1:1:9 followed by detection with Sakaguchi reagent, a single spot with $R_f=0.34(\pm 0.03)$ is obtained, the maltol test being negative. Under the same conditions, the starting streptomycin trihydrochloride gives a spot with $R_f=0.52(\pm 0.03)$ with positive response to both Sakaguchi and maltol reactions.

EXAMPLE 2

The method is that described in Example 1 but the reaction medium is brought to pH 6.5 with pyridine. The obtained product shows the same characteristics as those of the product obtained in Example 1.

EXAMPLE 3

Streptomycin trihydrochloride (103 g.) and 0.703 g. of triaminoguanidine hydrochloride are dissolved in 200 ml. of water and the solution is allowed to stand overnight at room temperature.

The solution is then concentrated by evaporation of the solvent to obtain a syrup which is taken up with absolute ethanol. After triturating, a powder is obtained which is purified by dissolution in 250 ml. of methanol followed by addition of ether to give tri(streptomycylideneamino)quanidine nonahydrochloride. This product is practically devoid of the antibiotic potency of the starting streptomycin tri-hydrochloride against *Escherichia coli* and *Micrococcus pyogenes* var. *aureus* (ATCC 6538 P).

When the obtained tri(streptomycylideneamino)guanidine nonahydrochloride is examined by ascending paper chromatography on Schleicher & Schüll No. 2043 (paper washed with acid) in the system n-propanol/acetic acid/pyridine/water 10:1:1:9 followed by detection with Sakaguchi reagent, a single spot with $R_f=0.22$ ($\pm 0.03$) is obtained, the maltol test being negative. Under the same conditions, the starting streptomycin trihydrochloride gives a spot with $R_f=0.52$ ($\pm 0.03$) with positive response to both Sakaguchi and maltol reactions.

EXAMPLE 4

Streptomycin trihydrochloride (13.8 g.) and 1,2-dihydrazinoethane dihydrochloride (1.47 g.) are dissolved in 250 ml. of water. The reaction medium is brought to pH 6.5 with pyridine and there allowed to stand overnight at room temperature.

The solution is concentrated by evaporation of the solvent under reduced pressure, to obtain a syrup which is taken up with absolute ethanol. After triturating, a powder is obtained, which is purified by dissolution in 250 ml. of methanol followed by addition of ether to yield 1,2 - di - streptomycylidenehydrazino - ethane hexahydrochloride.

This product is practically devoid of the antibiotic activity of the starting streptomycin against *E. coli* and *Micrococcus pyogenes* var. *aureus* (ATCC 6538 P).

When 1,2 - di - streptomycylidenehydrazino - ethane hexahydrochloride is examined by ascending paper chromatography on Schleicher and Schüll No. 2043 in the system n-propanol/acetic acid/pyridine/water 10:1:1:9, a Sakaguchi positive spot is obtained different from that of the starting streptomycin trihydrochloride.

EXAMPLE 5

Using the technique described in Example 4 but replacing the 1,2 - dihydrazino - ethane dihydrochloride therein specified by 1.72 g. of 1,4 - dihydrazino - butane dihydrochloride, there is obtained upon completion of the steps therein indicated 1,2 - di - streptomycylidenehydrazinobutane hexahydrochloride.

This product is practically devoid of the antibiotic activity of the starting streptomycin against *E. coli* and *Micrococcus pyogenes* var. *aureus* (ATCC 6538 P).

When 1,4 - di - streptomycylidenehydrazino - butane hexahydrochloride is examined by ascending paper chromatography on Schleicher and Schüll No. 2043 in the system n-propanol/acetic acid/pyridine/water 10:1:1:9 a Sakaguchi positive spot is obtained different from that of the starting streptomycin trihydrochloride.

EXAMPLE 6

Using the technique described in Example 4 but replacing the 1,2 - dihydrazino - ethane dihydrochloride therein specified by 1.79 g. of 1,6 - dihydrazino - hexane dihydrochloride there is obtained upon completion of the steps therein indicated 1,6 - di - streptomycylidenehydrazinohexane hexahydrochloride.

This product is practically devoid of the antibiotic activity of the starting streptomycin against *E. coli* and *Micrococcus pyogenes* var. *aureus* (ATCC 6538 P).

When 1,6 - di - streptomycylidenehydrazino - hexane hexahydrochloride is examined by ascending paper chromatography on Schleicher and Schüll No. 2043 in the system n-propanol/acetic acid/pyridine water 10:1:1:9 a Sakaguchi positive spot is obtained different from that of the starting streptomycin trihydrochloride.

EXAMPLE 7

Using the technique described in Example 4 but replacing the 1,2 - dihydrazino - ethane dihydrochloride therein specified by 1.9 g. of 1,3 - dihydrazino - benzene dihydrochloride, there is obtained upon completion of the steps therein indicated 1,3 - di - streptomycylidenehydrazinobenzene hexahydrochloride.

This product is practically devoid of the antibiotic activity of the starting streptomycin against *E. coli* and *Micrococcus pyogenes* var. *aureus* (ATCC 6538 P).

When 1,3 - di - streptomycylidenehydrazino - benzene hexahydrochloride is examined by ascending paper chromatography on Schleicher and Schüll No. 2043 in the system n-propanol/acetic acid/pyridine/water 10:1:1:9, a Sakaguchi positive spot is obtained different from that of the starting streptomycin trihydrochloride.

EXAMPLE 8

Using the technique described in Example 4 but replacing the 1,2 - dihydrazino - ethane dihydrochloride therein specified by 1.9 g. of 1,4 - dihydrazino - benzene dihydrochloride, there is obtained upon completion of the steps therein indicated 1,4 - distreptomycylidene - hydrazinobenzene hexahydrochloride.

This product is practically devoid of the antibiotic activity of the starting streptomycin against *E. coli* and *Micrococcus pyogenes* var. *aureus* (ATCC 6538 P).

When 1,4 - distreptomycylidenehydrazinobenzene hexahydrochloride is examined by ascending paper chromatography on Schleicher and Schüll No. 2043 in the system n-propanol/acetic acid/pyridine/water 10:1:1:9, a Sakaguchi positive spot is obtained different from that of the starting streptomycin trihydrochloride.

EXAMPLE 9

Using the technique described in Example 4 but replacing the 1,2 - dihydrazino - ethane dihydrochloride therein specified by 2.6 g. of 2,2' - dihydrazino - biphenyl dihydrochloride, there is obtained upon completion of the steps therein indicated 2',2 - di - streptomycylidene-hydrazino - biphenyl hexahydrochloride.

This product is practically devoid of the antibiotic activity of the starting streptomycin against *E. coli* and *Micrococcus pyogenes* var. *aureus* (ATCC 6538 P).

When 2,2' - di - streptomycylidenehydrazino - biphenyl hydrochloride is examined by ascending paper chromatography on Schleicher and Schüll No. 2043 in the system n-propanol/acetic acid/pyridine/water 10:1:1:9, a Sakaguchi positive spot is obtained different from that of the starting streptomycin trihydrochloride.

EXAMPLE 10

Using the technique described in Example 4 but replacing the 1,2 - dihydrazino - ethane dihydrochloride therein specified by 2.7 g. of 4,4' - dihydrazino - diphenylmethane dihydrochloride, there is obtained upon completion of the steps therein indicated 4,4'-distreptomycylidenehydrazinodiphenylmethane, hexahydrochloride.

This product is practically devoid of the antibiotic activity of the starting streptomycin against *E. coli* and *Micrococcus pyogenes* var. *aureus* (ATCC 6538 P).

When 4,4' - di - streptomycylidenehydrazino - diphenylmethane hexahydrochloride is examined by ascending paper chromatography on Schleicher and Schüll No. 2043, in the system n - propanol/acetic acid/pyridine/water 10:1:1:9, a Sakaguchi positive spot is obtained different from that of the starting streptomycin trihydrochloride.

EXAMPLE 11

Using the technique described in Example 4 but replacing the 1,2 - dihydrazino - ethane dihydrochloride therein specified by 2.35 g. of 2,3 - dihydrazino - naphthalene dihydrochloride, there is obtained upon completion of the steps therein indicated 2,3 - di - streptomycylidenehydrazino - naphthalene hexahydrochloride.

This product is practically devoid of the antibiotic activity of the starting streptomycin against *E. coli* and *Micrococcus pyogenes* var. *aureus* (ATCC 6538 P).

When 2,3-di-streptomycylidenehydrazino-naphthalene hexahydrochloride is examined by ascending paper chromatography on Schleicher and Schüll No. 2043 in the system n-propanol/acetic acid/pyridine/water 10:1:1:9, a Sakaguchi positive spot is obtained different from that of the starting streptomycin trihydrochloride.

EXAMPLE 12

Using the technique described in Example 4 but replacing the 1,2-dihydrazino-ethane dihydrochloride therein specified by 2.35 g. of 2,7-dihydrazino-naphthalene dihydrochloride, there is obtained upon completion of the steps therein indicated 2,7 - di - streptomycylidenehydrazinonaphthalene hexahydrochloride.

This product is practically devoid of the antibiotic activity of the starting streptomycin against *E. coli* and *Micrococcus pyogenes* var. *aureus* (ATCC 6538 P).

When 2,7-di-streptomycylidenehydrazino-naphthalene hexahydrochloride is examined by ascending paper chromatography on Schleicher and Schüll No. 2043 in the system n-propanol/acetic acid/pyridine/water 10:1:1:9, a Sakaguchi positive spot is obtained different from that of the starting streptomycin trihydrochloride.

EXAMPLE 13

Streptomycin trihydrochloride (13.8 g.), o,o'-ethylenebis(hydroxylamine)dihydrochloride (1.467 g.) and pyridine (1.8 g.) are dissolved in 250 ml. of water and the solution is allowed to stand overnight at room temperature. The solution is then concentrated by evaporation of the solvent to obtain a syrup, which is taken up with 100 ml. of absolute methanol and poured with stirring into 440 ml. of dry acetone. The white precipitate is filtered and dried to yield 12.95 g. of crude o,o'-(distreptomycylideneamino)ethylene glycol hexahydrochloride, which is practically devoid of the antibiotic activity of the starting streptomycin against *E. coli* and *Micrococcus pyogenes* var. *aureus* (ATCC 6538 P). Purification of the obtained product is carried out by dissolving the crude material in 250 ml. of methanol and subsequent precipitation by addition of ether.

When the obtained o,o'-(distreptomycylideneamino)ethylene glycol hexahydrochloride is examined by ascending paper chromatography on Schleicher and Schüll No. 2043 (paper washed with acid) in the system n-propanol/acetic acid/pyridine/water 10:1:1:9, followed by detection with Sakaguchi reagent, a single spot with $R_f=0.36$ ($\pm 0.03$) is obtained.

Under the same conditions, the starting streptomycin trihydrochloride gives a spot with $R_f=0.52$ ($\pm 0.03$) with positive response to both Sakaguchi and maltol reactions.

EXAMPLE 14

Using the technique of Example 13 but replacing the o,o'-ethylenebis(hydroxylamine)dihydrochloride therein specified by 1.19 g. of malonic acid dihydrazide dihydrochloride, there is obtained upon completion of the steps therein indicated malonic acid di(streptomycylidenehydrazide) hexahydrochloride.

This product is practically devoid of the antibiotic activity of the starting streptomycin against *E. coli* and *Micrococcus pyogenes* var. *aureus* (ATCC 6538 P).

When malonic acid di(streptomycylidenehydrazide) hexahydrochloride is examined by ascending paper chromatography on Schleicher and Schüll No. 2043 (paper washed with acid) in the system n-propanol/acetic acid/pyridine/water 10:1:1:9, followed by detection with Sakaguchi reagent, a single spot with $R_f=0.31$ ($\pm 0.03$) is obtained.

Under the same conditions, the starting streptomycin trihydrochloride gives a spot with $R_f=0.52$ ($\pm 0.03$) with positive response to both Sakaguchi and maltol reactions.

EXAMPLE 15

Using the technique described in Example 13 but replacing o,o'-ethylenebis(hydroxylamine)dihydrochloride therein specified by 1.18 g. of ethanetetracarboxylic acid tetrahydrazide dihydrochloride, there is obtained upon completion of the steps therein indicated ethanetetracarboxylic acid tetra(streptomycylidenehydrazide) dodecahydrochloride.

This product is practically devoid of the antibiotic activity of the starting streptomycin against *E. coli* and *Micrococcus pyogenes* var. *aureus* (ATCC 6538 P).

When ethanetetracarboxylic acid tetra(streptomycylidenehydrazide)dodecahydrochloride is examined by ascending paper chromatography on Schleicher and Schüll No. 2043 (paper washed with acid) in the system n-propanol/acetic acid/pyridine/water 10:1:1:9, a Sakaguchi positive spot is obtained, different from that of the starting streptomycin trihydrochloride.

EXAMPLE 16

Ingredients: Mg./capsule
Di(streptomycylideneamino)guanidine (7HCl) -- 500
Magnesium stearate ---------------------- 20

The above ingredients are thoroughly mixed and filtered through an ASTM No. 50 screen into a No. 0 hard gelatin capsule, the volume being adjusted with lactose.

About three of these capsules are administered daily by oral route.

What we claim is:

1. A polystreptomycylidene compound of the formula $$(\text{streptomycylidene}=N)_n A'$$

wherein $n$ is a positive integer from 2 to 4 and $A'$ is a polyvalent group derived from a compound of the formula $H_2N-A-NH_2$, where A is $O-(CH_2)_{n'}-O$ and $n'$ is a positive integer from 2 to 6,

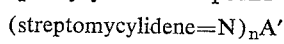

and Z is lower alkylene-polycarbonyl, where the alkylene residue has 1 to 4 carbon atoms and the polycarbonyl residue has 2 to 4 carbonyl groups, or a residue from the class consisting of lower alkyl of 1 to 6 carbon atoms, benzene, biphenyl, diphenylmethane, and naphthalene, or a pharmaceutically acceptable addition salt thereof.

2. Di(streptomycylideneamino)guanidine, or a pharmaceutically acceptable addition salt thereof.

3. Tri(streptomycylideneamino)guanidine, or a pharmaceutically acceptable addition salt thereof.

4. o,o'-(Distreptomycylideneamino)ethylene glycol, or a pharmaceutically acceptable addition salt thereof.

5. An oral pharmaceutical dosage unit composition comprising a compound as claimed in claim 1 in the form of a capsule, tablet or suspension.

References Cited

UNITED STATES PATENTS

| | | | |
|---|---|---|---|
| 2,355,911 | 8/1944 | Graenacher et al. | 260—210 |
| 2,532,393 | 12/1950 | Brink et al. | 260—210 |
| 2,664,418 | 12/1953 | Winsten | 260—210 |

LEWIS GOTTS, *Primary Examiner.*

ELBERT L. ROBERTS, *Examiner.*

JOHNNIE R. BROWN, *Assistant Examiner.*